United States Patent
Hasegawa et al.

(10) Patent No.: US 6,676,461 B2
(45) Date of Patent: Jan. 13, 2004

(54) SPEED DETECTING DEVICE MOUNTING STRUCTURE FOR A VESSEL

(75) Inventors: Toru Hasegawa, Saitama (JP); Yusuke Funayose, Saitama (JP); Tomohiko Yashiro, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/191,541

(22) Filed: Jul. 10, 2002

(65) Prior Publication Data

US 2003/0017761 A1 Jan. 23, 2003

(30) Foreign Application Priority Data

Jul. 18, 2001 (JP) .................................. 2001-217662

(51) Int. Cl.[7] .............................................. B63H 11/00
(52) U.S. Cl. ........................... 440/2; 73/187; 440/38
(58) Field of Search ........................ 73/181, 187; 440/2, 440/38–43

(56) References Cited

U.S. PATENT DOCUMENTS

| | | | | |
|---|---|---|---|---|
| 3,706,224 A | * | 12/1972 | Overs | 73/187 |
| 5,369,360 A | * | 11/1994 | Amyot | 324/174 |
| 5,606,253 A | * | 2/1997 | Boucher et al. | 324/174 |
| 5,699,749 A | * | 12/1997 | Yamada et al. | 114/55.51 |
| 6,101,965 A | * | 8/2000 | Koyanagi | 114/288 |

FOREIGN PATENT DOCUMENTS

JP    11-304831 A    11/1999

* cited by examiner

*Primary Examiner*—Sherman Basinger
(74) *Attorney, Agent, or Firm*—Birch, Stewart, Kolasch & Birch, LLP

(57) ABSTRACT

To provide a speed detecting device mounting structure for a vessel in which a paddle is prevented from being entangled with rubbish and seaweed in the sea, and the paddle is prevented from being damaged or picking-up mud or the like from the sea bottom. In a vessel, a water jet pump is provided at a rear portion thereof. A ship bottom plate is provided below the water jet pump. A speed detecting device is mounted on the ship bottom plate. A paddle of the speed detecting device detects the flow rate of water flow and obtains the propelling speed of the vessel. The speed detecting device mounting structure for a vessel is constructed in such a manner that the paddle of the speed detecting device is disposed on the upper surface of the ship bottom plate, an opening is formed at the portion of the ship bottom plate forwardly of the speed detecting device, and water taken through the opening is guided to the speed detecting device.

21 Claims, 5 Drawing Sheets

US 6,676,461 B2

SPEED DETECTING DEVICE MOUNTING STRUCTURE FOR A VESSEL

CROSS-REFERENCE TO RELATED APPLICATIONS

This nonprovisional application claims priority under 35 U.S.C. §119(a) on Patent Application No. 2001-217662 filed in Japan on Jul. 18, 2001, the entirety of which is hereby incorporated by reference.

BACKGROUND OF THE INVENTION

1. Field of the Invention

The present invention relates to a speed detecting device mounting structure for a vessel in which a speed detecting device is provided on a ship bottom plate to obtain a propelling speed of the vessel by detecting a flow rate of water by means of a paddle in the speed detecting device.

2. Description of Background Art

One of the existing types of jet propulsion boats includes a water jet pump mounted on a rear portion of the vessel body. The jet propulsion boat is propelled by sucking water from the ship bottom by driving the water jet pump and splashing or spraying the sucked water rearward. This type of jet propulsion boat is provided with a speed detecting device on the ship bottom plate at the rear portion of the vessel body for detecting the propelling speed.

For example, a speed detecting device mounting structure is disclosed in Japanese Patent Laid-Open No. 304831/11 entitled "PROPELLING SPEED DETECTING DEVICE FOR VESSELS." This technology will be described below with reference to FIG. 6 of the present specification, which is a view similar to FIG. 5 of the above publication.

FIG. 6 is a bottom view of the rear portion of the vessel in the background art, showing a state in which a speed detecting device is mounted on the ship bottom plate. The vessel 100 includes a ship bottom plate 101 formed with a flowing water draining groove 102 extending in the fore-and-aft direction of the vessel. A notch 103 is formed at the rear end of the flowing water draining groove 102. A body of revolution (hereinafter referred to as a paddle) 106 of the speed detecting device 105 is rotatably mounted on the notch 103. Furthermore, a sensor body 108 for detecting the number of revolutions of the paddle 106 is provided in the vicinity of the paddle 106.

According to the above speed detecting device mounting structure, when the vessel 100 is propelled by a water jet pump (not shown), water runs along the flowing water draining groove 102 as shown by the arrow a. Water flowing in the direction of the arrow a reaches the paddle 106, strikes the blades 107 of the paddle 106, and rotates the paddle 106. The propelling speed of the vessel 100 can be obtained by detecting the number of revolutions of the paddle 106 by the sensor body 108.

However, the speed detecting device mounting structure is provided with the paddle 106 at the notch 103 of the ship bottom plate 101 in the background art. Accordingly, the paddle 106 is exposed to the sea via the notch 103. Therefore, the paddle 106 may be entangled with rubbish or seaweed drifting in the sea.

In addition, since the paddle 106 is exposed to the sea, if the vessel 100 runs ashore, the paddle 106 is in danger of contacting the sea bottom. Accordingly, the paddle 106 may be damaged or mud from the sea bottom may be picked-up by the paddle 106, affecting proper operation of the speed detecting device.

SUMMARY OF THE INVENTION

Accordingly, the object of the present invention is to provide a speed detecting device mounting structure for a vessel in which a paddle is prevented from being entangled with rubbish or seaweed in the sea, and from being damaged by the sea bottom or picking-up mud from the sea bottom.

In order to solve the problems described above, according to a first aspect of the present invention, a vessel comprises a water jet pump provided at a rear portion of the vessel, a ship bottom plate provided below the water jet pump, a speed detecting device mounted on the ship bottom plate, a paddle of the speed detecting device being rotated by water so as to obtain the propelling speed based on the rotation of the paddle, wherein the paddle is disposed above the ship bottom plate, an opening is formed at the portion of the ship bottom plate forwardly of the paddle, and water taken through the opening is guided to the paddle.

The paddle of the speed detecting device is disposed above the ship bottom plate and an opening is formed forwardly of the paddle. By covering the paddle with the ship bottom plate, the paddle can be closed off from the sea by the ship bottom plate. Therefore, the paddle can be protected by the ship bottom plate. Accordingly, the paddle can be prevented from being entangled with rubbish or seaweed drifting in the sea.

In addition, by protecting the paddle with the ship bottom plate, even if the vessel runs ashore, the paddle is prevented from being damaged or picking-up mud from the sea-bottom.

Further scope of applicability of the present invention will become apparent detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
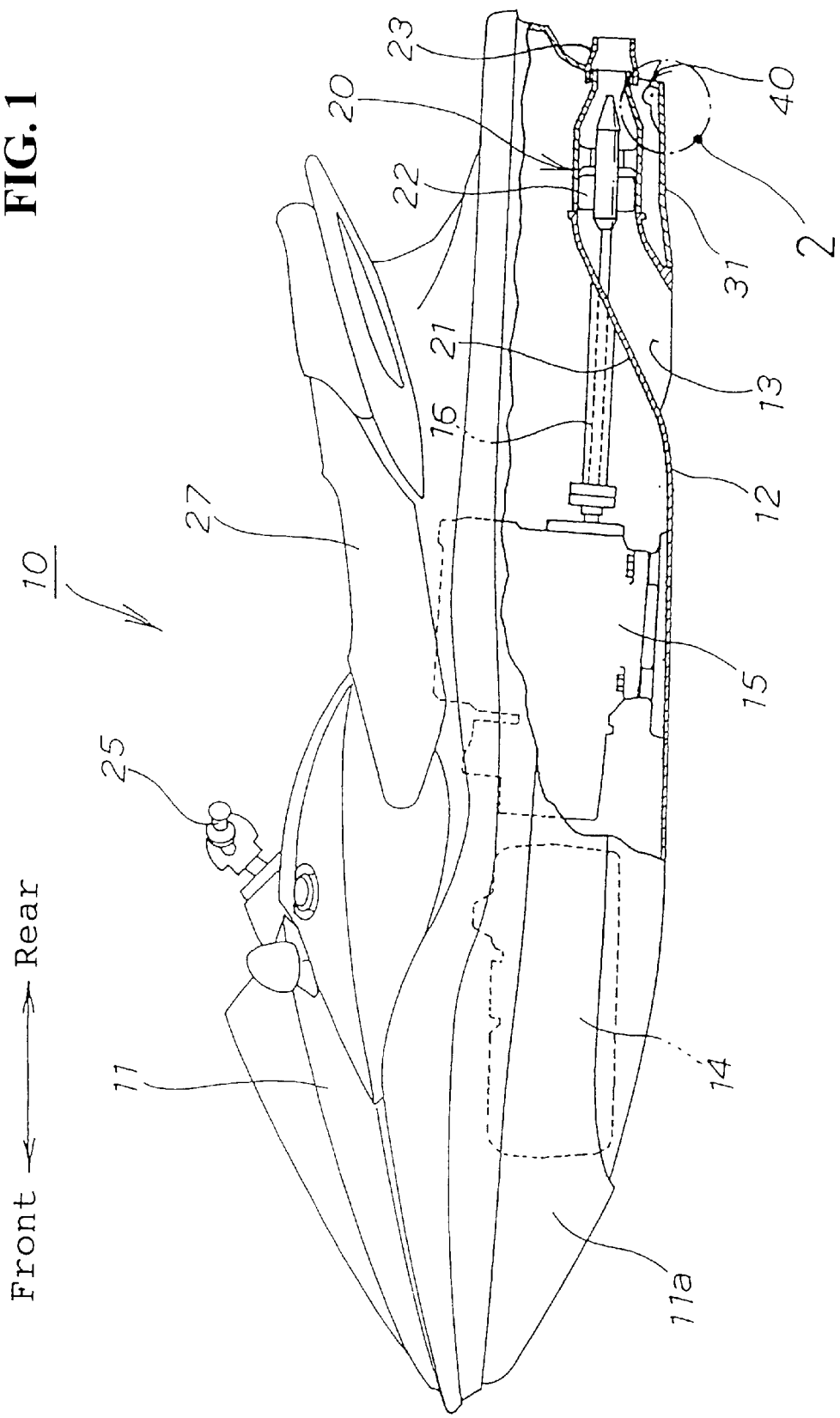
FIG. 1 is a side view of a vessel provided with a speed detecting device mounting structure according to the present invention.

The present invention will now be described with reference to the accompanying drawings. It should be noted that the figures should be viewed in a direction of orientation of the reference numerals.

FIG. 1 is a side view of a vessel provided with a speed detecting device mounting structure according to the present invention.

The vessel 10 includes a fuel tank 14 mounted on a front portion 11a of the vessel body 11. An engine 15 is provided rearwardly of the fuel tank 14. A water jet pump 20 is provided rearwardly of the engine 15. A steering handle 25 is mounted above the fuel tank 14. A seat 27 is mounted rearwardly of the steering handle 25. A ship bottom plate 31 is provided below the water jet pump 20. Furthermore, a speed detecting device 40 is mounted on the ship bottom plate 31.

The water jet pump 20 includes a housing 21 extending rearwardly from the opening 13 of the vessel bottom 12. An impeller 22 is rotatably mounted in the housing 21 and is connected to the drive shaft 16 of the engine 15.

The speed detecting device 40 mounted on the ship bottom plate 31 is located below the rear end of the housing 21.

In the water jet pump 20, water sucked through the opening 13 of the vessel bottom 12 can be splashed or sprayed rearwardly of the vessel body 11 through the rear end opening of the housing 21 from the steering pipe (steering nozzle) 23 by driving the engine 15 and rotating the impeller 22.

The steering pipe (steering nozzle) 23 is a member mounted at the rear end of the housing so as to be capable of a swinging motion in the lateral direction. The steering nozzle 23 is used for controlling the steering direction of the vessel body 11 by operating the steering handle 25 in the lateral direction to swing the steering nozzle 23.

The vessel 10 can be propelled by feeding fuel from a fuel tank 14 to the engine 15 and driving the engine 15, transmitting a driving force of the engine 15 to the impeller 22 via a drive shaft 16, sucking water from the opening 13 of the vessel bottom 12 by rotating the impeller 22, and splashing or spraying the sucked water through the rear end of the housing 21 from the steering nozzle 23.

Figure 2:
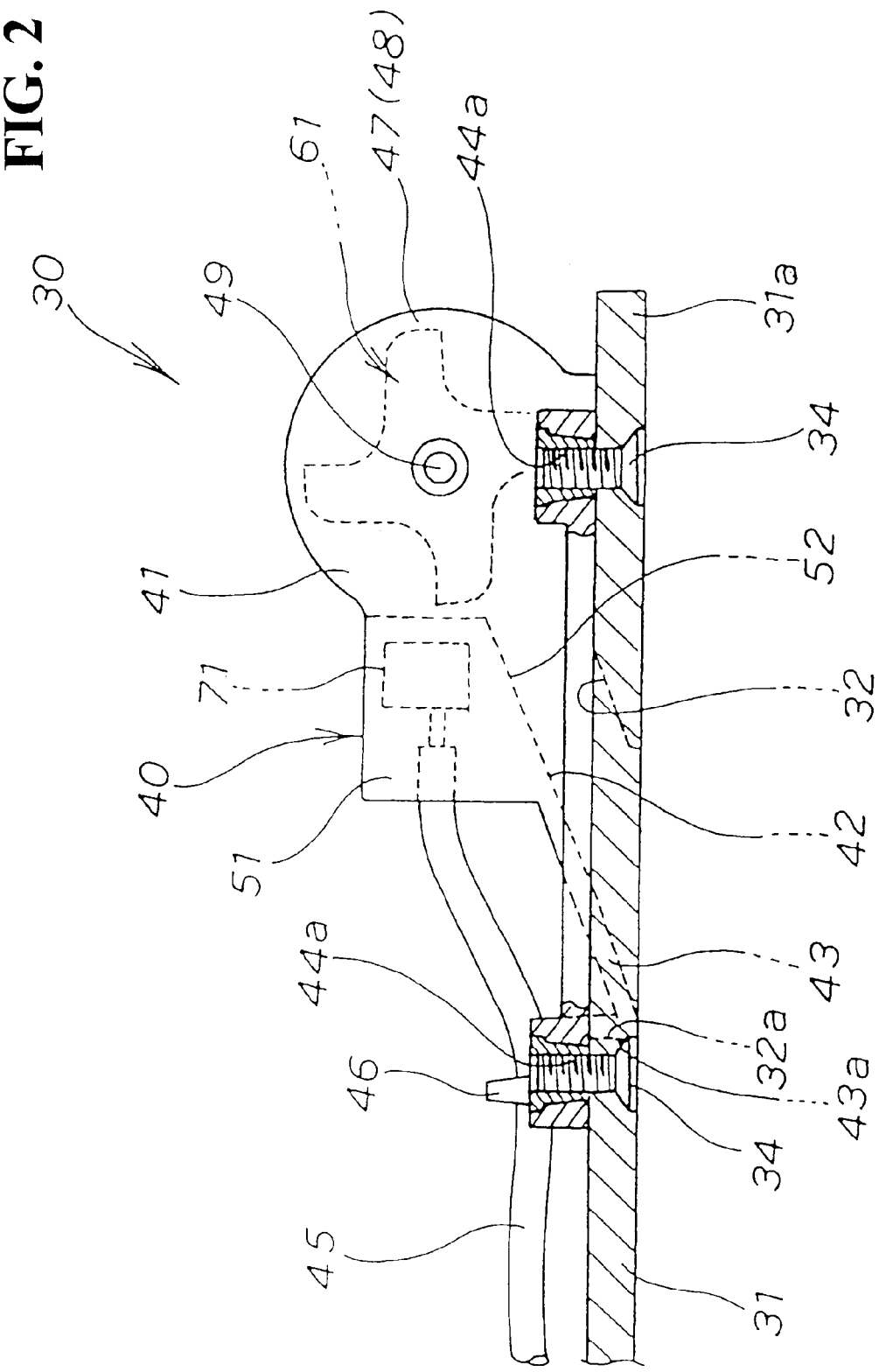
FIG. 2 is an enlarged view of a portion designated by the numeral 2 in FIG. 1.

FIG. 2 is an enlarged view of a portion represented by the numeral 2 in FIG. 1. FIG. 2 is a side view of a speed detecting device mounting structure 30 for a vessel in a state in which the speed detecting device 40 is attached to the ship bottom plate 31.

In the speed detecting device mounting structure 30 for a vessel, a speed detecting device 40 is placed on the upper surface of the ship bottom plate 31. A front insert 43 of the speed detecting device 40 is inserted into the opening 32 of the ship bottom plate 31. The tip 43a of the front insert 43 is abutted against the front wall surface 32a of the opening 32. The opening 32 is brought into communication with the conducting channel 42 of the speed detecting device 40. Furthermore, the speed detecting device 40 is mounted on the ship bottom plate 31 by screwing the bolts 34 into screw holes 44a formed in the base portion 44 of the speed detecting device 40.

The speed detecting device mounting structure 30 for a vessel will now be described in detail below.

Figure 3:
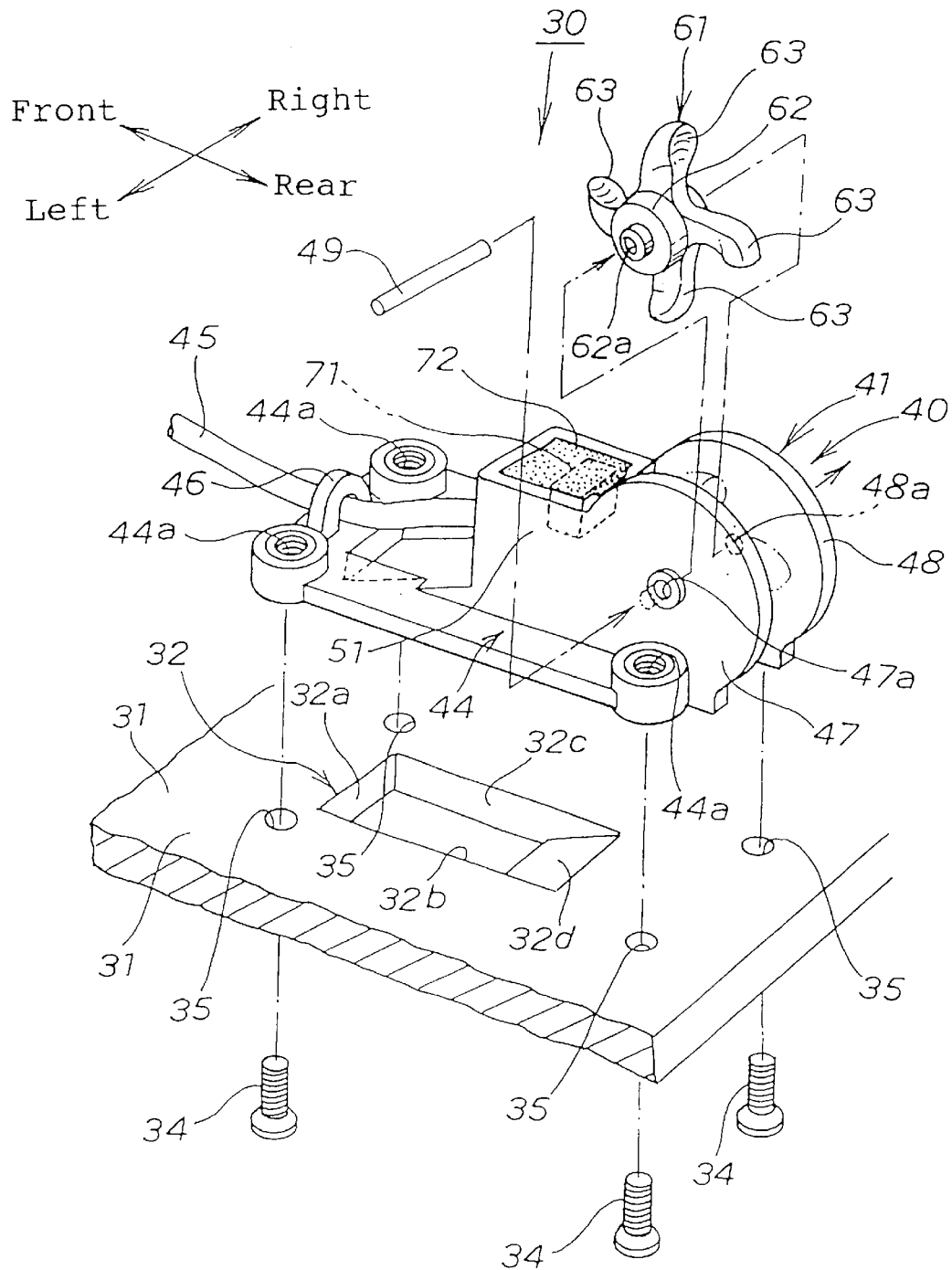
FIG. 3 is an exploded perspective view of the speed detecting device mounting structure for a vessel according to the present invention.

FIG. 3 is an exploded perspective view of the speed detecting device mounting structure for a vessel according to the present invention.

The speed detecting device mounting structure 30 for a vessel includes a paddle 61 of the speed detecting device 40 above the ship bottom plate 31. An opening 32 is formed at a portion of the ship bottom plate 31 forwardly of the paddle 61. A conducting channel 42 (shown in FIG. 2) for conducting water from the opening 32 to the paddle 61 is formed on the speed detecting device 40.

The opening 32 of the ship bottom plate 31 is a rectangular through hole extending in the fore-and-aft direction of the vessel 10. A front wall surface 32a and left and right wall surfaces 32b, 32c are formed as vertical planes. A rear wall surface 32d is formed with an upward inclination toward the rear. The ship bottom plate 31 is provided with through holes 35 for passing the bolts 34 therethrough. The through holes 35 are located adjacent the four corners of the opening 32.

The speed detecting device 40 includes a case 41 to be mounted on the ship bottom plate 31, a paddle 61 to be rotatably mounted at the rear end of the case 41, a sensor body 71 provided forwardly of the paddle 61 and connected to the speedometer (not shown) via the harness 45, and a mold 72 for imbedding the sensor body 71 therein.

The case 41 includes a base portion 44 formed in a substantially rectangular shape. Screw holes 44a are formed at four corners of the base portion 44. A holding portion 46 for holding a harness 45 is formed between the front right and left screw holes 44a, 44a. The base portion 44 is formed with left and right arcuate supporting plates 47, 48 at the rear end thereof. Mounting holes 47a, 48a are formed at substantially centers of the left and right arcuate supporting plates 47, 48, respectively. A shaft 49 is inserted into the mounting holes 47a, 48a for rotatably mounting the paddle 61 between the left and right arcuate supporting plates 47, 48. A rectangular sensor storage 51 is formed forwardly of the left and right arcuate supporting plates 47, 48. Furthermore, the bottom surface 52 (shown in FIG. 2) of the sensor storage 51 has an upward inclination toward the rear.

The bottom surface 52 of the sensor storage 51 is a portion on which a conducting channel 42 (shown in FIG. 2) is formed.

The paddle 61 is formed, for example, of a magnetic material such as plamag (plastic magnets). The paddle 61 includes a cylindrical paddle body 62, a through hole 62a for passing the shaft 49 therethrough formed at the center of the paddle body 62. Furthermore, four blades 63 are formed on the outer periphery of the paddle body 62 at intervals of 90°.

Of course, the paddle 61 is capable of being constructed of a magnetic material other than plamag.

The blade 63 has a water-receiving surface formed into a curved concave shape for receiving water thereon. Therefore, the paddle 61 can be rotated effectively about the shaft 49. The number of blades 63 is not limited to four, but is arbitrary.

When mounting the paddle 61 between the arcuate supporting plates 47, 48 of the case 41, the paddle 61 is disposed between the left and right arcuate supporting plates 47, 48. The shaft 49 is inserted into the mounting holes 47a, 48a of the left and right arcuate supporting plates 47, 48 and the through hole 62a of the paddle 61 as shown by the arrow. Accordingly, the paddle 61 is rotatably mounted between the left and right arcuate supporting plates 47, 48.

The sensor body 71 is a magnet sensor for detecting the number of revolutions of the paddle 61 based on variations in magnet field generated by the rotations of the paddle 61. The sensor body 71 then transmits the detected signals to the speedometer.

Figure 4:
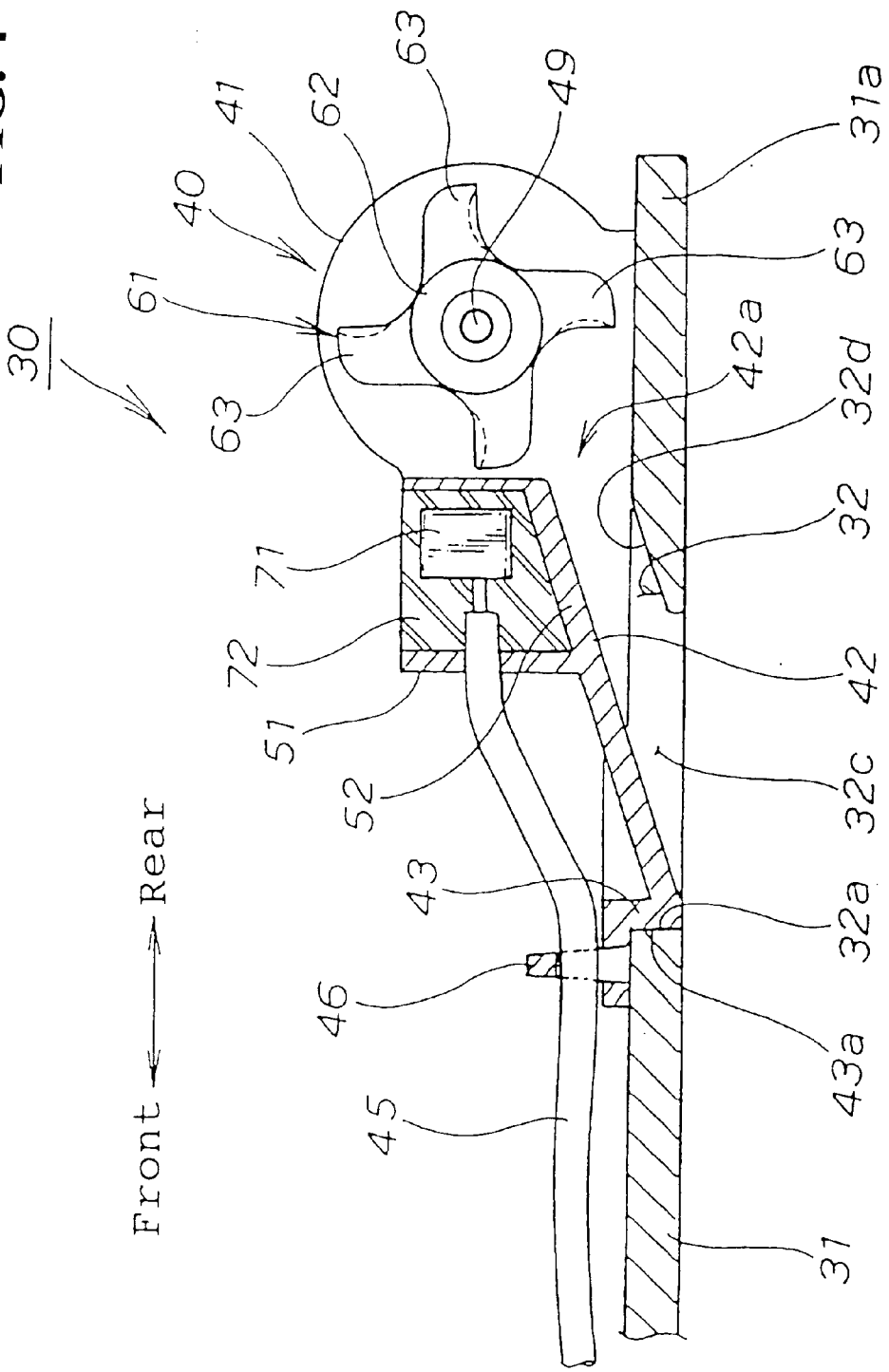
FIG. 4 is a cross sectional view of a speed detecting device mounting structure for a vessel according to the present invention.

FIG. 4 is a cross sectional view of the speed detecting device mounting structure for a vessel according to the present invention.

The speed detecting device mounting structure 30 for a vessel includes a paddle 61 rotatably disposed above the rear end 31a of the ship bottom plate 31 via a case 41. A sensor body 71 is disposed in the sensor storage 51 and is connected to the speedometer (not shown) via a harness 45.

In the speed detecting device mounting structure 30 for a vessel, the front insert 43 of the speed detecting device 40 is inserted into the opening 32 of the ship bottom plate 31. The tip 43a of the front insert 43 is abutted against the front wall surface 32a of the opening 32. The opening 32 is brought into communication with the conducting channel 42.

In addition, in the speed detecting device mounting structure 30 for a vessel, the conducting channel 42 is upwardly inclined toward the rear. Accordingly, the blades 63 of the paddle 61 face toward the exit 42a of the conducting channel 42.

Therefore, water taken through the opening 32 of the ship bottom plate 31 flows to the conducting channel 42. Water passed through the conducting channel 42 flows rearwardly from the exit 42a of the conducting channel 42. Accordingly, the water strikes the blades 63 of the paddle 61. The water striking the blades 63 of the paddle 61 rotates the paddle 61 counterclockwise about the shaft 49 of the paddle 61.

By providing the conducting channel 42 with an upward inclination, water taken from the opening 32 of the ship bottom plate 31 can be conducted smoothly to the conducting channel 42. Furthermore, the water in the conducting channel 42 can be conducted smoothly to the exit 42a of the conducting channel 42 and then smoothly from the exit 42a of the conducting channel 42 to the blades 63 of the paddle 61. Therefore, the paddle 61 can be effectively rotated about the shaft 49.

When the propelling speed of the vessel 10 shown in FIG. 1 is high, the flowing speed of water in the conducting channel 42 increases. Accordingly, the paddle 61 rotates at a high speed. In contrast, when the propelling speed of the vessel 10 is low, the flowing speed of water in the conducting channel 42 decreases. Accordingly, the paddle 61 rotates at a low speed.

Since the conducting channel 42 is formed integrally with the case 41, as shown in FIG. 4, the number of components can be reduced.

In the speed detecting device 40, the sensor body 71 is disposed in the sensor storage 51, and the sensor body 71 is disposed so as to face toward the blades 63 of the paddle 61. By disposing the sensor body 71 so as to face toward the blades 63 of the paddle 61, variations in magnetic field generated by the rotation of the paddle 61 can be reliably detected. Therefore, the number of revolutions of the paddle 61 can be accurately detected by the sensor body 71.

With this speed detecting device 40, when the paddle 61 rotates about the shaft 49 and variations in magnetic field are generated, the sensor body 71 detects the number of rotations of the paddle 61 based on variations in the magnetic field. The detected signals are transmitted to the speedometer from the sensor body 71. Accordingly, the propelling speed of the vessel 10 can be displayed on the speedometer.

The paddle 61 of the speed detecting device 40 is rotatably disposed on the ship bottom plate 31 via the case 41. The opening 32 is formed forwardly of the paddle 61 at a position spaced away from the paddle 61. Therefore, the paddle 61 is closed off from the sea by the ship bottom plate 31. Accordingly, the paddle 61 can be protected by the ship bottom plate 31.

In the unlikely event that the vessel 10 runs ashore, the paddle 61 can be prevented from being damaged from the sea bottom or picking-up mud from the sea bottom.

By protecting the paddle 61 with the ship bottom plate 31, the paddle 61 is prevented from being entangled with, for example, rubbish or seaweed drifting in the sea.

In addition, in the speed detecting device mounting structure 30 for the vessel 10, the sensor body 71 is disposed in the sensor storage 51 so that it can be disposed above the ship bottom plate 31. In addition, the sensor body 71 is disposed in the sensor storage 51, so that the sensor body 71 can be disposed above the bottom surface 52, which is a component of the conducting channel 42.

Therefore, the sensor body 71 can be closed off from the sea by the ship bottom plate 31 or the bottom surface 52. Therefore, the sensor body 71 can be protected in the same manner as the paddle 61. In other words, in the unlikely event that the vessel 10 runs ashore, the sensor body 71 is prevented from being damaged by the sea bottom or picking-up mud or the like from the sea bottom.

After the sensor body 71 is stored in the sensor storage 51, mold resin 72 is filled in the sensor storage 51, so that the sensor body 71 can be embedded within the mold resin 72. Therefore, the sensor body 71 is protected by the mold resin 72.

The operation of the speed detecting device mounting structure for a vessel will now be described with reference to FIG. 5.

Figure 5:
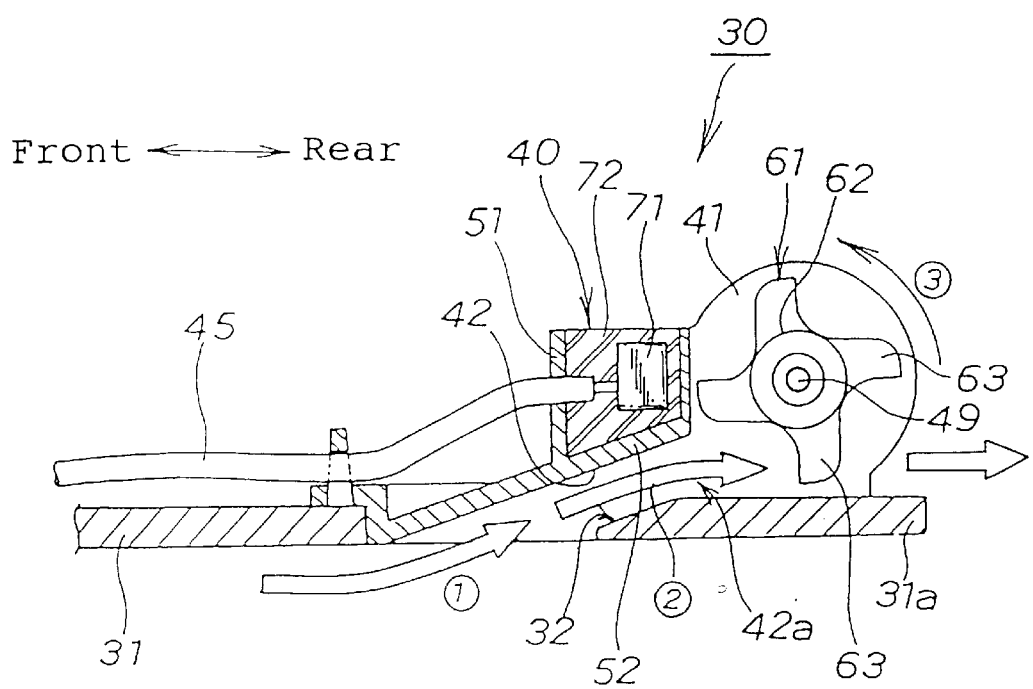
FIG. 5 is an explanatory drawing illustrating the operation of a speed detecting device mounting structure for a vessel according to the present invention.
Figure 6:
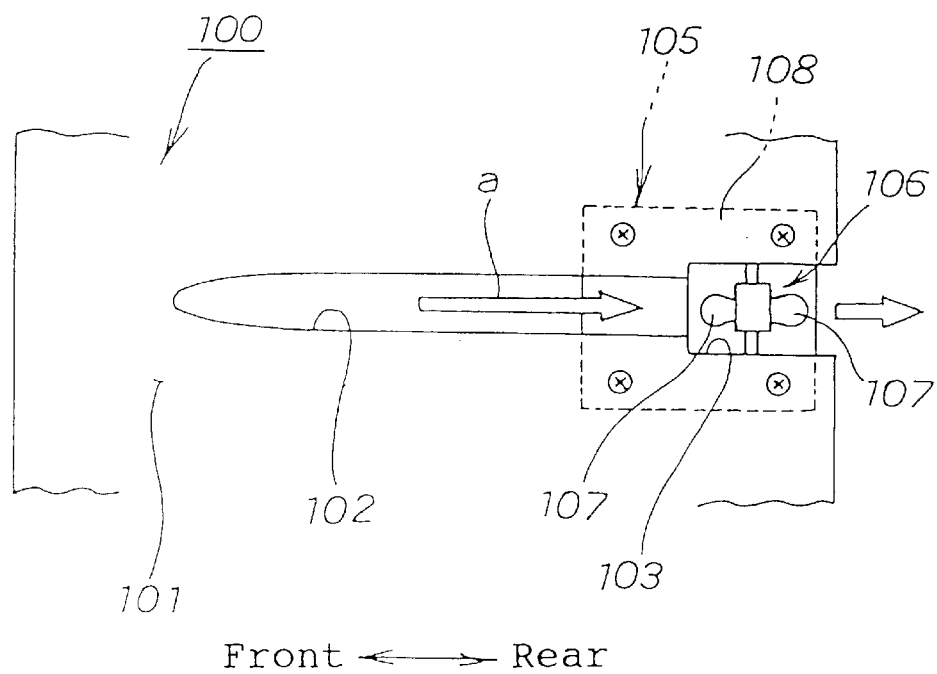
FIG. 6 is a bottom view of a rear portion of the vessel according to the background art.

FIG. 5 is an explanatory drawing illustrating the operation of a speed detecting device mounting structure for a vessel according to the present invention.

By propelling the vessel 10 shown in FIG. 1 by the water jet pump 20, water is taken through the opening 32 of the ship bottom plate 31 as shown by the arrow ①, and water is then conducted to the conducting channel 42 of the speed detecting device 40.

Subsequently, water is conducted rearward along the upwardly inclined conducting channel 42, and flows toward the blades 63 of the paddle 61 from the exit 42a of the conducting channel 42 as shown by the arrow ②.

By providing the conducting channel 42 with an upward inclination, water taken from the opening 32 of the ship bottom plate 31 can be conducted smoothly to the blades 63 of the paddle 61 via the conducting channel 42.

By allowing water to strike the blades 63 of the paddle 61, the paddle 61 is rotated about the shaft 49 as shown by the arrow ③.

By rotating the paddle 61 formed of electromagnetic material about the shaft 49, the magnetic field varies. The number of revolutions of the paddle 61 is detected by the sensor body 71 based on variations in the magnetic field. The detected signals are transmitted to the speedometer via the harness 45. Consequently, the propelling speed of the vessel 10 can be displayed on the speedometer.

In the speed detecting device mounting structure 30 for vessels, the paddle 61 is disposed above the ship bottom plate 31 (that is, above the rear end 31a of the ship bottom plate 31. Furthermore, the paddle 61 is closed off from the sea by the rear end 31a of the ship bottom plate 31.

Therefore, in the unlikely event that the vessel 10 runs ashore, the paddle 61 is prevented from being damaged by the sea bottom or picking-up mud from the sea bottom. Simultaneously, the paddle 61 is prevented from being entangled with rubbish or seaweed drifting in the sea.

In the aforementioned embodiment, an example in which the conducting channel 42 is provided in the speed detecting device 40 for conducting water to the paddle 61 through the conducting channel 42 was explained. However, the conducting channel 42 may be provided on the ship bottom plate 31 to obtain the same effect.

In the aforementioned embodiment, an example in which the number of revolutions of the paddle 61 is detected based on variations in the magnetic field by forming the paddle 61 of the speed detecting device 40 of magnetic material and providing a magnetic sensor as the sensor body 71 has been described. However, the speed detecting device in which an optical sensor is employed is also applicable.

The configuration of the case 41 of the speed detecting device 40 is not limited to the configuration in the embodiment, but it is possible to form the case 41 in a preferred configuration for a particular application.

The present invention, being constructed as described above, exercises the following advantages.

In the invention according to the first aspect, a paddle of the speed detecting device is disposed above the ship bottom plate, and an opening is formed forwardly of the paddle. Therefore, the paddle is closed off from the sea by the ship bottom plate, so that the paddle is protected by the ship bottom plate. Accordingly, the paddle is prevented from being entangled, for example, with rubbish or seaweed drifting in the sea.

In addition, by protecting the paddle with the ship bottom plate, when the vessel runs ashore for example, the paddle is prevented from being damaged by the sea bottom or picking-up mud from the sea bottom.

As a consequence, the maintenance of the vessel can easily be performed without effort.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed detecting device mounting structure in a vessel comprising:
   a water jet pump provided at a rear portion of the vessel;
   a ship bottom plate provided below the water jet pump said ship bottom plate including an opening formed therein; and
   a speed detecting device mounted on the ship bottom plate, a paddle of the speed detecting device being rotated by water so as to obtain a propelling speed based on the rotation of the paddle,
   wherein the paddle is disposed above the ship bottom plate, an entirety of the opening is located forwardly of the paddle, and water taken through the opening is guided to the paddle.

2. The speed detecting device mounting structure in a vessel according to claim 1, wherein said speed detecting device further comprises a conducting channel for conducting water from said opening to said paddle.

3. The speed detecting device mounting structure in a vessel according to claim 2, wherein said speed detecting device includes a front insert inserted into said opening of the ship bottom plate, a tip of said front insert is abutted against a front wall surface of said opening, and said opening is in communication with said conducting channel.

4. The speed detecting device mounting structure in a vessel according to claim 1, wherein said opening of the ship bottom plate is a rectangular through-hole extending in a fore-and-aft direction of the vessel, a front wall surface and left and right wall surfaces of said through-hole are formed as vertical planes, a rear wall surface is formed with an upward inclination toward a rear of the vessel.

5. The speed detecting device mounting structure in a vessel according to claim 1, wherein said speed detecting device further comprises:
   a case mounted on the ship bottom plate, said paddle being rotatably mounted at a rear end of said case;
   a sensor body provided forwardly of said paddle, said sensor body being connectable to a speedometer of the vessel via a harness; and
   a mold for imbedding said sensor body therein.

6. The speed detecting device mounting structure in a vessel according to claim 5, wherein said case includes a rectangular sensor storage for receiving said sensor body and said mold, a bottom surface of said sensor storage having an upward inclination toward a rear of the vessel.

7. A vessel, comprising:
   a water jet pump provided at a rear portion of the vessel;
   a ship bottom plate provided below said water jet pump, said ship bottom plate including an opening formed therein; and
   a speed detecting device mounted on said ship bottom plate, said speed detecting device including a paddle located above said ship bottom plate and rearwardly of a rear wall of said opening in said ship bottom plate,
   wherein water taken through said opening in said ship bottom plate is guided to said paddle to rotate said paddle to obtain a propelling speed of said vessel based on the rotation of said paddle.

8. The vessel according to claim 7, wherein said speed detecting device further comprises a conducting channel for conducting water from said opening to said paddle.

9. The vessel according to claim 8, wherein said speed detecting device includes a front insert inserted into said opening of the ship bottom plate, a tip of said front insert is abutted against a front wall surface of said opening, and said opening is in communication with said conducting channel.

10. The vessel according to claim 7, wherein said opening of the ship bottom plate is a rectangular through-hole extending in a fore-and-aft direction of the vessel, a front wall surface and left and right wall surfaces of said through-hole are formed as vertical planes, a rear wall surface is formed with an upward inclination toward a rear of the vessel.

11. The vessel according to claim 7, wherein said speed detecting device further comprises:
   a case mounted on the ship bottom plate, said paddle being rotatably mounted at a rear end of said case;
   a sensor body provided forwardly of said paddle, said sensor body being connectable to a speedometer of the vessel via a harness; and
   a mold for imbedding said sensor body therein.

12. The vessel according to claim 11, wherein said case includes a rectangular sensor storage for receiving said sensor body and said mold, a bottom surface of said sensor storage having an upward inclination toward a rear of the vessel.

13. A speed detecting device mounting structure for a vessel, the vessel including a water jet pump provided at a rear portion thereof, said speed detecting device mounting structure comprising:
   a ship bottom plate provided below the water jet pump, said ship bottom plate including an opening formed therein; and a speed detecting device mounted on said ship bottom plate, said speed detecting device including a paddle located above said ship bottom plate and rearwardly of a rear wall of said opening in said ship bottom plate, wherein water taken through said opening in said ship bottom plate is guided to said paddle to rotate said paddle to obtain a propelling speed of the vessel based on the rotation of said paddle.

14. The speed detecting device mounting structure for a vessel according to claim 13, wherein said speed detecting device further comprises a conducting channel for conducting water from said opening to said paddle.

15. The speed detecting device mounting structure for a vessel according to claim 14, wherein said speed detecting device includes a front insert inserted into said opening of the ship bottom plate, a tip of said front insert is abutted against a front wall surface of said opening, and said opening is in communication with said conducting channel.

16. The speed detecting device mounting structure for a vessel according to claim 13, wherein said opening of the ship bottom plate is a rectangular through-hole extending in a fore-and-aft direction of the vessel, a front wall surface and left and right wall surfaces of said through-hole are formed as vertical planes, a rear wall surface is formed with an upward inclination toward a rear of the vessel.

17. The speed detecting device mounting structure for a vessel according to claim 13, wherein said speed detecting device further comprises:

a case mounted on the ship bottom plate, said paddle being rotatably mounted at a rear end of said case;

a sensor body provided forwardly of said paddle, said sensor body being connectable to a speedometer of the vessel via a harness; and a mold for imbedding said sensor body therein.

18. The speed detecting mounting structure for a vessel according to claim 17, wherein said case includes a rectangular sensor storage for receiving said sensor body and said mold, a bottom surface of said sensor storage having an upward inclination toward a rear of the vessel.

19. The speed detecting device according to claim 1, wherein at least a portion of said ship bottom plate is located directly below said paddle.

20. The vessel according to claim 7, wherein at least a portion of said ship bottom plate is located directly below said paddle.

21. The speed detecting device according to claim 13, wherein at least a portion of said ship bottom plate is located directly below said paddle.

* * * * *